United States Patent [19]

Meeker

[11] Patent Number: 5,665,185
[45] Date of Patent: Sep. 9, 1997

[54] PROCESS FOR PREPARING GLASS FIBER CONTAINING POLYMER SHEET

[75] Inventor: Brian L. Meeker, Maumee, Ohio

[73] Assignee: ESFI Acquisition, Inc., Mogadore, Ohio

[21] Appl. No.: 599,331

[22] Filed: Feb. 9, 1996

[51] Int. Cl.⁶ .................................................. B32B 31/20
[52] U.S. Cl. .................... 156/62.2; 156/279; 156/309 C; 264/112
[58] Field of Search .............................. 156/62.2, 279, 156/309.6; 264/112

[56] References Cited

U.S. PATENT DOCUMENTS

| | | |
|---|---|---|
| 3,000,772 | 9/1961 | Lunn . |
| 3,158,668 | 11/1964 | Johnson . |
| 3,558,423 | 1/1971 | Rossetti, Jr. . |
| 4,086,116 | 4/1978 | Yazaki et al. . |
| 4,596,736 | 6/1986 | Eichhorn et al. . |
| 4,810,445 | 3/1989 | Lamb, Sr. et al. . |
| 4,948,661 | 8/1990 | Smith et al. . |
| 4,989,538 | 2/1991 | Tsmura et al. . |
| 5,108,678 | 4/1992 | Hirasaka et al. . |
| 5,198,063 | 7/1993 | Howard et al. . |

FOREIGN PATENT DOCUMENTS 2040801A 7/1980 United Kingdom .

OTHER PUBLICATIONS

McGraw–Hill Dictionary of Scientific & Technical Terms 3rd Edition pp. 28, 604.

Primary Examiner—Michael W. Ball
Assistant Examiner—Sam Chuan Yao
Attorney, Agent, or Firm—Donald R. Fraser

[57] ABSTRACT

A glass fiber containing polymer sheet is prepared by providing a non-woven carrier web, superposing an adhesion film over the carrier web, applying a layer of glass fibers onto the adhesion film, and laminating together the assemblage.

8 Claims, 1 Drawing Sheet

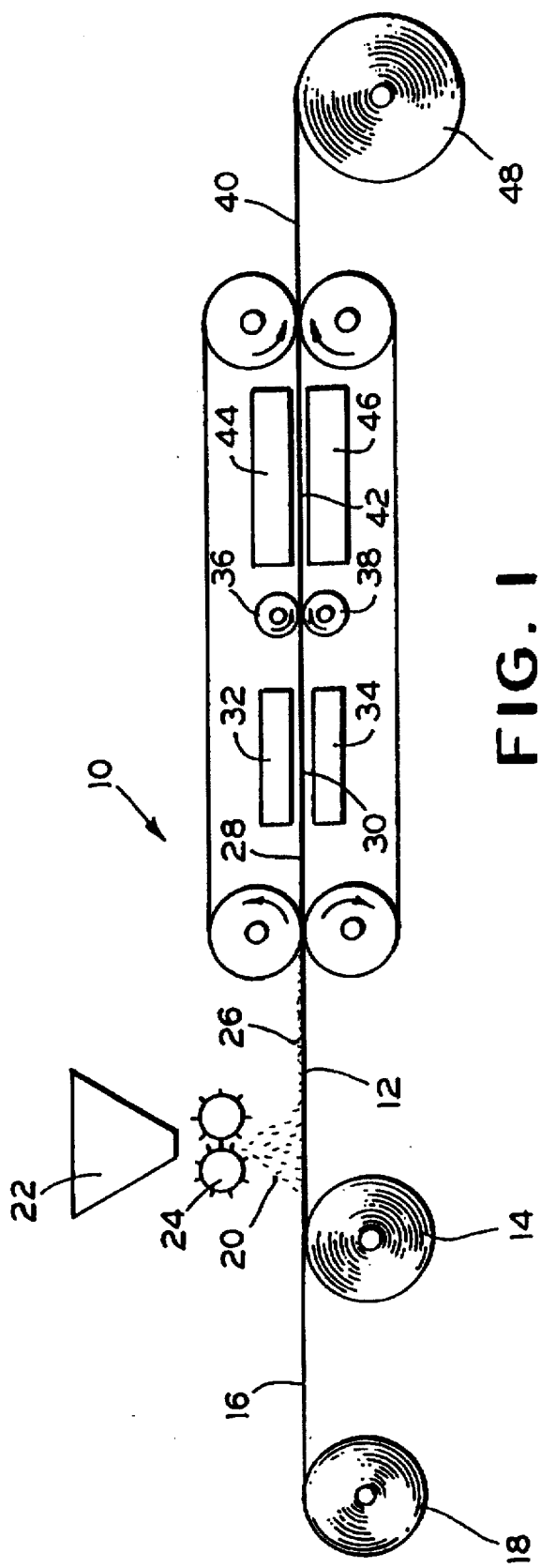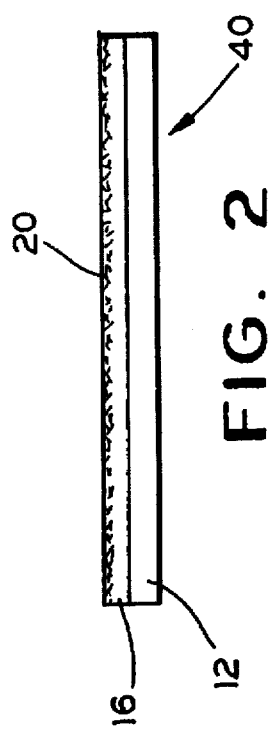

PROCESS FOR PREPARING GLASS FIBER CONTAINING POLYMER SHEET

FIELD OF THE INVENTION

This invention relates generally to a glass fiber containing polymer sheet and a process for preparing same. More particularly, the invention is directed to a polymer sheet having glass fibers substantially encapsulated therein, and to a process for preparing same.

BACKGROUND OF THE INVENTION

It is well-known to employ glass fibers in composite articles to strengthen and reinforce same. Glass fibers are most generally placed into a plastic or polymer matrix where the high tensile strength glass fibers cause the deformable or elastic matrix to become more rigid.

Glass fibers are often used to stabilize laminar structures. For example, a resin-impregnated glass fiber mat is often used to stiffen composite layers of a molded automotive vehicle headliner, so that it will not sag due to the effect of gravity over the life of the vehicle. Glass fibers can also be added to laminar structures by sprinkling chopped fibers onto one of the laminae, then placing the next layer thereover and laminating the assemblage together.

U.S. Pat. No. 4,989,538 to Tamura et al. discloses apparatus for sprinkling a resin composition onto a web, and a sheet material produced by said apparatus. A liquid resin composition is mixed uniformly with glass fibers and sprinkled onto a polyethylene film. A second film of polyethylene is superposed over the resin and glass fiber mixture, and the assemblage is pressed and partially cured, to form an SMC or BMC sheet.

It would be desirable to prepare a polymer sheet material having glass fibers substantially encapsulated therein, for use in preparing laminar composite molded articles which require the dimensional stability and stiffness afforded by such fibers.

SUMMARY OF THE INVENTION

Accordant with the present invention, there surprisingly has been discovered a process for preparing a glass fiber containing polymer sheet. The process comprises the steps of:

1. A process for preparing a glass fiber containing polymer sheet, comprising:
   providing a non-woven carrier web;
   superposing an adhesion film immediately adjacent the non-woven carrier web;
   applying a layer of uniformly distributed, randomly oriented glass fibers onto the adhesion film; and
   laminating together the layer of glass fibers, adhesion fiber, and non-woven carrier web by heating same to a temperature above the plastic set temperature of the adhesion film and compressing the layer of glass fibers, adhesion film, and carrier web, said adhesion fiber adhering to the non-woven carrier web, and said glass fibers being substantially encapsulated in the surface region of the adhesion film.

The invention further includes a glass fiber containing polymer sheet prepared by the inventive process.

The process and glass fiber containing polymer sheet of the present invention are particularly useful for manufacturing molded automotive vehicle headliners and other relatively rigid but easily moldable decorative panels.

Further objects and advantages of this invention will be apparent from the following description and appended claims, reference being made to the accompanying drawings forming a part of the specification, wherein like reference characters designate corresponding parts in the several views.

BRIEF DESCRIPTION OF THE DRAWINGS

FIG. 1 is a schematic representation of a process for preparing a glass fiber containing polymer sheet, embodying the features of the present invention.

FIG. 2 is a side elevation view of a glass fiber containing polymer sheet according to the present invention.

DESCRIPTION OF THE PREFERRED EMBODIMENT

Referring now to FIG. 1, there is shown generally at 10 a schematic representation of a process for preparing a glass fiber containing polymer sheet. A non-woven carrier web 12 is provided from a non-woven carrier web supply roll 14 in a horizontal plane. An adhesion film 16 is provided from an adhesion film supply role 18. The adhesion film 16 is superposed immediately adjacent the non-woven carrier web 12.

Glass fibers 20 from a feed hopper 22 are applied at a controlled rate to a surface of the adhesion film 16 using a flow and distribution device 24 such as a star valve. Alternatively, chopped glass fibers can be applied by feeding continuous strands of glass to a chopper which discharges directly onto the surface of the adhesion film 16. The flow and distribution device 24, or the chopper in the alternative embodiment, is operated so as to cause a layer 26 of glass fibers 20, having a uniform, randomly oriented distribution, to be deposited onto the adhesion film 16.

The assemblage, comprising the non-woven carrier web 12, the adhesion film 16, and the layer 26 of glass fibers 20, is then laminated together. In a preferred lamination process illustrated in FIG. 1, the lamination operation is accomplished by means of a belt press.

During lamination, the assemblage is compressed in an initial compression zone 28 and heated in a heating zone 30 by conventional means such as, for example, by radiant heating elements 32 and 34 positioned above and below the belts of the press. The assemblage is heated to a temperature above the plastic set temperature of the adhesion film 16. By the term "plastic set temperature" as it is used herein is meant that temperature below which an applied stress will not cause substantially permanent deformation to the adhesion film 16, and above which the adhesion film 16 is partially melted and capable of being molded. Thus, the adhesion film partially melts and flows around and through substantially all of the filaments of the glass fibers 20 in the vicinity of the surface of the adhesion film 16 to which the layer of glass fibers 26 was initially applied. Moreover, the partially melted adhesion film 16 bonds to the non-woven carrier web 12.

The assemblage is further compressed, to assist in substantially encapsulating the glass fibers 20 and bonding the non-woven carrier web 12 and the adhesion film 16, by means of pinch rolls 36 and 38 which urge the belts of the belt press toward one another. Thus, the assemblage, comprising the non-woven carrier web 12, the adhesion film 16, and the layer 26 of glass fibers 20, is laminated to produce the glass fiber containing polymer sheet 40 according the present invention. The glass fibers 20 are generally positioned at the surface region of the adhesion film 16 in the resultant glass fiber containing polymer sheet 40.

Conveniently, the polymer sheet 40 is cooled by conveying same through a cooling zone 42, comprising conventional cooling means such as, for example, water cooled air blowers 44 and 46 positioned above and below the belts of the belt press. The cooled glass fiber containing polymer sheet 40 is then wound onto a take-up roll 48.

FIG. 2 illustrates the features of the glass fiber containing polymer sheet 40, including the non-woven carrier web 12 adhered to the adhesion film 16 and the layer 26 of glass fibers 20 substantially encapsulated in the surface region of the adhesion film 16. By the term "substantially encapsulated" as it is used herein is meant that each of the glass fibers is substantially imbedded into the surface region of the adhesion film so that only a very small amount, if any, of any individual fiber protrudes out of the adhesion film.

Conveniently, the belt press may utilize any belt material which can be heated and cooled, yet will resist adhesion to the non-woven carrier web, adhesion film, or glass fibers. Specifically, TEFLON or TEFLON coated belts may be used. The belt press may be operated at any convenient rate which allows the application of a uniform, randomly oriented distribution of glass fibers to a thickness sufficient to impart the required strength to the ultimately produced article employing the glass fiber containing polymer sheet according to the present invention. Typically, the belt press is operated at a speed of about 3 to about 15 meters per minute.

The non-woven carrier web of the present invention may be prepared from any conventional non-woven material, made from staple lengths of, e.g., cotton, metal, carbon, glass, or thermoplastic polymer fibers or combinations thereof mechanically positioned in a random manner and usually bonded together with a synthetic adhesive. The non-woven carrier web may additionally comprise laminates of these materials. Preferred non-woven carrier webs may be obtained from DuPont de Nemours of Wilmington, Del. under the trade designations SONTERRA or TYVEK. The thickness of the non-woven carrier web may vary over wide limits from about 1 mil to about 100 mils.

The adhesion film according to the present invention may be produced from conventional thermoplastic polymer materials which are well-known in the art of preparing laminated articles, and may comprise either monolithic films or non-woven materials. Useful polymers from which the adhesion film may be produced include, but are not necessarily limited to, low density polyethylene, high density polyethylene, linear low density polyethylene, polypropylene, chlorinated polyethylene, polyoxyalkylenes, styrenes, and the like, as well as copolymers and blends thereof. A preferred polymer for preparing the adhesion film comprises a blend of high density polyethylene and low density polyethylene. The thicknesses of the adhesion film may vary over wide limits, but generally is within a range from about 0.8 mil to about 8 mils. A preferred thickness is about 2 mils. An adhesion film prepared from a blend of high density polyethylene and low density polyethylene is generally heated to a temperature of about 450° F. during the lamination process, in order to cause the adhesion film to bond to the non-woven carrier web and substantially encapsulate the glass fibers. One ordinarily skilled in the art will readily recognize that other lamination temperatures will be required when employing adhesion films prepared from other polymer materials.

The glass fibers are generally applied to the first polymer sheet at a rate so as to produce a glass fiber containing polymer sheet product having an average glass fiber content from about 20 grams per square meter to about 150 grams per square meter. A preferred concentration, useful for preparing a glass fiber containing polymer sheet having wide applicability, is about 70 grams per square meter. Useful glass fibers comprise bundles of filaments, each bundle containing from about 54 to about 144 ends. The glass fibers may have lengths ranging from about one-half inch to about 3 inches. A preferred glass fiber has a weight of about 110 yards per pound and an LOI value of about 2.1%. Such glass fibers are generally "sized", i.e., coated to render them more compatible with the thermoplastics of the adhesion film.

Preparation of the glass fiber containing polymer sheet according to the present invention conveniently does not require an adhesive. The adhesion film encapsulates the layer of glass fibers, and adheres to the non-woven carrier web as a result of being heated above its plastic set temperature and pressed together by the nip rolls and the belts of the press. Thus, the glass fiber containing polymer sheet comprises a convenient sheet stock, for combining with other sheet materials for preparing laminate articles. The glass fibers are substantially encapsulated within a supple polymer sheet, and are therefore isolated so as to not irritate the hands of workers preparing laminate articles employing the inventive glass fiber containing polymer sheet.

An example of the many applications for the glass fiber containing polymer sheet is its use in an automotive vehicle headliner. Two layers of the glass fiber containing polymer sheet may be laminated or adhered to the major surfaces of a polyurethane foam board. A layer of felt or other decorative material may simultaneously or thereafter be laminated or adhered to one of the glass fiber containing polymer sheets, to form a laminated decorative panel. The decorative panel may subsequently be formed using conventional means such as, for example, a molding press, to prepare a three-dimensional, molded vehicle headliner. Such a headliner is relatively inflexible and will retain its molded shape over time due to the incorporation into the headliner of the glass fibers provided by the glass fiber containing polymer sheets of the present invention.

While certain representative embodiments and details have been shown for the purpose of illustrating the present invention, it will be apparent to those skilled in the art that various changes in applications can be made therein, and that the invention may be practiced otherwise than as specifically illustrated and described without departing from its spirit and scope.

What is claimed is:

1. A process for preparing a glass fiber containing polymer sheet, comprising:

providing a non-woven carrier web;

superposing an adhesion film immediately adjacent the non-woven carrier web;

applying a layer of uniformly distributed, randomly oriented glass fibers onto the exposed surface of the adhesion film; and laminating together the layer of glass fibers, adhesion film, and non-woven carrier web by heating same to a temperature above the plastic set temperature of the adhesion film and compressing the layer of glass fibers, adhesion film, and carrier web, said adhesion film adhering to the non-woven carrier web, and said glass fibers being encapsulated substantially within the exposed surface region of the adhesion film.

2. The process for preparing a glass fiber containing polymer sheet according to claim 1, wherein the carrier web is provided continuously at a rate of from about 3 to about 15 meters per minute.

3. The process for preparing a glass fiber containing polymer sheet according to claim 1, wherein the non-woven carrier web is provided in a horizontal plane.

4. The process for preparing a glass fiber containing polymer sheet according to claim 1, wherein the glass fibers are chopped fibers applied from the discharge of a chopper.

5. The process for preparing a glass fiber containing polymer sheet according to claim 1, wherein the adhesion film comprises a blend of high density polyethylene and low density polyethylene.

6. The process for preparing a glass fiber containing polymer sheet according to claim 1, wherein the non-woven carrier web, adhesion film, and glass fibers are heated to a temperature of about 380° F. during the lamination process.

7. The process for preparing a glass fiber containing polymer sheet according to claim 1, wherein the lamination step is carried out in a belt press having TEFLON coated belts.

8. The process for preparing a glass fiber containing polymer sheet according to claim 1, wherein the glass fibers comprise bundles of filaments, each said bundle containing from about 54 to about 144 ends, said glass fibers having lengths from about one-half inch to about 3 inches.

* * * * *